US006943341B2

(12) United States Patent
Huber et al.

(10) Patent No.: US 6,943,341 B2
(45) Date of Patent: Sep. 13, 2005

(54) POSITION MEASURING SYSTEM

(75) Inventors: Walter Huber, Traunstein (DE); Udo Linnemann, Traunreut (DE); Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 47 days.

(21) Appl. No.: 10/768,986

(22) Filed: Jan. 30, 2004

(65) Prior Publication Data

US 2004/0227066 A1 Nov. 18, 2004

(30) Foreign Application Priority Data

Jan. 31, 2003 (DE) ........................................ 103 03 795

(51) Int. Cl.[7] .................................................. G01D 5/34
(52) U.S. Cl. .............................. 250/231.14; 250/231.16
(58) Field of Search ....................... 250/231.13–231.18, 250/229, 232, 233, 236; 398/77, 78, 87; 356/395, 499, 169, 170

(56) References Cited

U.S. PATENT DOCUMENTS 3,985,448 A 10/1976 Wiklund et al.
4,263,506 A 4/1981 Epstein .................. 250/231.16
4,866,269 A 9/1989 Wlodarczyk et al. .. 250/231.18
4,882,479 A * 11/1989 Hino ..................... 250/231.14

FOREIGN PATENT DOCUMENTS

DE 35 36 466 A1 4/1987
WO WO 02/23131 3/2002

OTHER PUBLICATIONS

Pending U.S. Appl. No. 10/380,847, Inventors: Holzapfel et al., filed Sep. 24, 2003.

* cited by examiner

*Primary Examiner*—David Porta
*Assistant Examiner*—Tony Ko
(74) *Attorney, Agent, or Firm*—Brinks Hofer Gilson & Lione

(57) ABSTRACT

A position measuring system that includes a scale having an incremental graduation track of a defined incremental graduation period and on at least one defined reference position, a reference marking field with a mean reference marking graduation period. A scanning unit movable with respect to the scale, the scanning unit having a plurality of scanning elements for generating scanning signals, wherein at least two phase-shifted incremental signals are generated as scanning signals. A first evaluation device that determines a rough reference position. A second evaluation device that determines a beat signal phase. A third evaluation device, which is suitable for unequivocally marking a beat signal period from the rough reference position and, if a defined phase position exists, to issue a fine reference position from the beat signal phase.

30 Claims, 6 Drawing Sheets

10
10
INC₋₁
-RR1
-RR2
REF₋₁
REF₊₁
INC₊₁
+RR2
+RR1
S
D
23
A
B
C
21
X<sub>REF</sub>
X<sub>REF</sub>
X
X
22

FIG. 3a
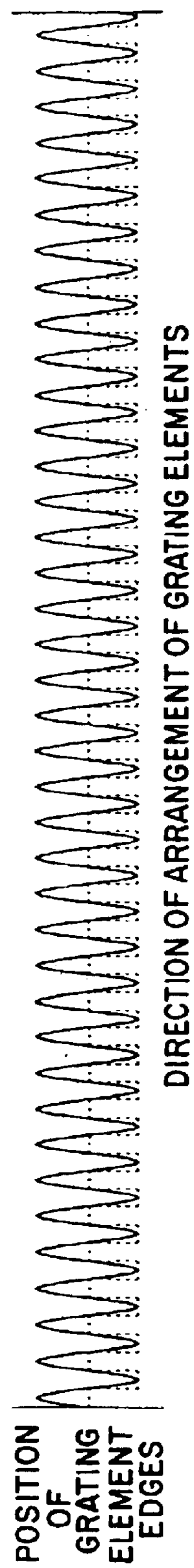
FIG. 3b
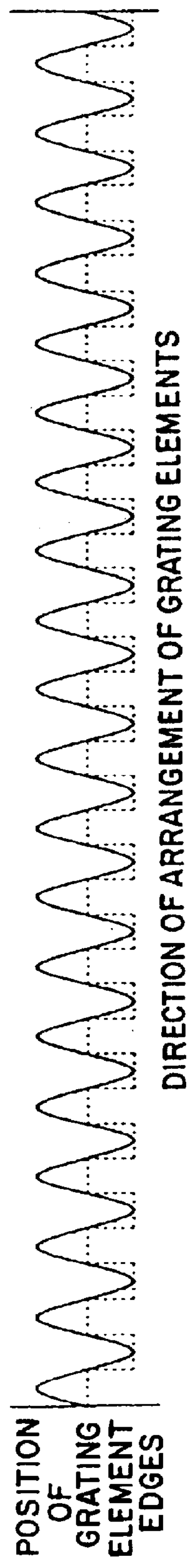
FIG. 3c
POSITION OF GRATING ELEMENT EDGES
DIRECTION OF ARRANGEMENT OF GRATING ELEMENTS A
B
C
31
S0
S90
32
S1
33
S2
S3
S4
40
41
S5
X REF,G
50
51
52
53
× N RI
× N INC
S6
S7
S8
φ S
φ INC
34
35
36
60
61
62
S10
S11
S5
S8
φ SOLL

POSITION MEASURING SYSTEM

Applicants claim, under 35 U.S.C. §119, the benefit of priority of the filing date of Jan. 31, 2003 of a German patent application, copy attached, Serial Number 103 03 795.0, filed on the aforementioned date, the entire contents of which is incorporated herein by reference.

BACKGROUND OF THE INVENTION

1. Field of the Invention

The present invention relates to a position measuring system comprising a scale and a scanning unit movable with respect to it.

2. Discussion of Related Art

As a rule, besides incremental signals regarding the relative offset of two parts that are movable with respect to each other, known position measuring systems provide also so-called reference pulse signals. With a defined relative position of the parts that are movable with respect to each other it is possible to provide an absolute reference of the position measurement by the reference pulse signals. Reference marking fields are arranged at one or several locations of the scale for generating the reference pulse signals. Inter alia, the scanning unit of the position measuring system includes at least one scanning plate with one or several scanning graduations by means of which it is possible to generate a reference pulse signal corresponding to the relative position of the scale and the scanning unit to be detected.

A number of options on the part of the scanning unit are known regarding the arrangement of the reference marking fields on the scale, or of the scanning graduations required for scanning the same.

For example, U.S. Pat. No. 4,263,506, the entire contents of which are incorporated herein by reference, discloses the arrangement of the reference marking fields on the scale laterally adjoining the graduation track with the incremental graduation.

Besides this, it is also possible to integrate the reference marking fields at at least one reference position directly into the graduation track with the incremental graduation, such as is proposed, for example, in U.S. Pat. No. 3,985,448, the entire contents of which are incorporated herein by reference. For example, one or several ridges or lines of the incremental graduation can be omitted at the desired location of the scale.

Further variations regarding the integration of reference marking fields into the track with the incremental graduation are known from DE 35 36 466 A1 and U.S. Pat. No. 4,866,269, the entire contents of which are incorporated herein by reference. In these publications it is proposed to design the reference marking fields in the incremental graduation as a periodic sequences of lines or ridges, or to use areas with changed optical properties differing from the remaining incremental graduation as reference marking fields.

In particular in the case of high-resolution optical position measuring systems, in which the scanning signals are generated based on the interference of superimposed partial beams of rays, there is the requirement in connection with the generation of reference pulse signals to also generate high-resolution reference pulse signals.

OBJECT AND SUMMARY OF THE INVENTION

It is therefore an object of the present invention to disclose a position measuring system by which the generation of high-resolution reference pulse signals is possible, besides the high-resolution incremental signals.

This object is attained by a position measuring system that includes a scale having an incremental graduation track of a defined incremental graduation period and on at least one defined reference position, a reference marking field with a mean reference marking graduation period, wherein the mean reference marking graduation period differs from the incremental graduation period. A scanning unit movable with respect to the scale, the scanning unit having a plurality of scanning elements for generating scanning signals, wherein at least two phase-shifted incremental signals are generated as scanning signals. A first evaluation device arranged downstream of the scanning unit that determines a rough reference position from a maximum of resultant disturbance with the scanning signals at a defined relative position of the scale and the scanning unit. A second evaluation device arranged downstream of the scanning unit that determines a beat signal phase from a difference between a whole-number multiple of a reference pulse signal phase and a whole-number multiple of an incremental signal phase. A third evaluation device arranged downstream of the first and second evaluation devices, which is suitable for unequivocally marking a beat signal period from the rough reference position and, if a defined phase position exists, to issue a fine reference position from the beat signal phase.

In accordance with the present invention, the determination of the reference position takes place in several steps. In the course of this, initially a rough reference position is determined by a first evaluation device from the maximum of the resulting disturbance in the scanning signals at a defined relative position of the scale and the scanning unit. The determination of a beat signal phase is performed by a second evaluation device from the difference between a whole-number multiple of the reference pulse signal phase and a whole-number multiple of the incremental signal phase. Finally, by a third evaluation device a high-resolution precision reference position is derived from the rough reference position and the beat signal phase.

Thus, one or several phase-shifted periodic scanning signals of high resolution can be detected through the steps in accordance with the present invention by detector arrays on the scanning side, which have a detectable disturbance in the area of the reference position. In accordance with the present invention it is possible to perform an additional high-resolution absolute position determination via the detection of the scanning signals which are disturbed with at this location.

The zero position, or reference position obtained from the reference pulse signals can be determined with a degree of accuracy sufficient for unequivocally marking an individual incremental signal period. Thus, the reproducibility of the position measuring system is put down to the reproducibility of the incremental position determination alone.

A number of options exist in regard to the concrete embodiment of the reference marking fields on the scale, as well as of the scanning plate in the scanning unit, i.e. as a result of the concrete scanning beam path.

It is therefore possible to integrate the scanned reference marking field into the incremental graduation track. Besides this, however, it is also possible to provide an arrangement of one or several suitably designed reference marking fields on the scale next to the incremental graduation track.

On the part of the detector, the detection of the resulting scanning signals can be provided in such a way that detector elements for the simultaneous detection of one or several phase-shifted scanning signals are provided, from which the incremental signal portions and the reference pulse signal portions then must be suitably separated. Alternatively to this it is also possible to provide separate detector elements for the detection of the different scanning signals in the form of incremental signals or reference pulse signals.

Moreover, several reference marking fields can be provided along the measuring path, which can then be provided at equal distances or can be distance-coded, etc.

Further advantages, as well as details of the present invention ensue from the following description of an exemplary embodiment by the attached drawings.

BRIEF DESCRIPTION OF THE DRAWINGS

FIGS. 3*a* to 3*c* are each representations for the explanation by example of the design of a reference marking field on the scale in accordance with the present invention;

DETAILED DESCRIPTION OF THE PREFERRED EMBODIMENTS

Figure 1:
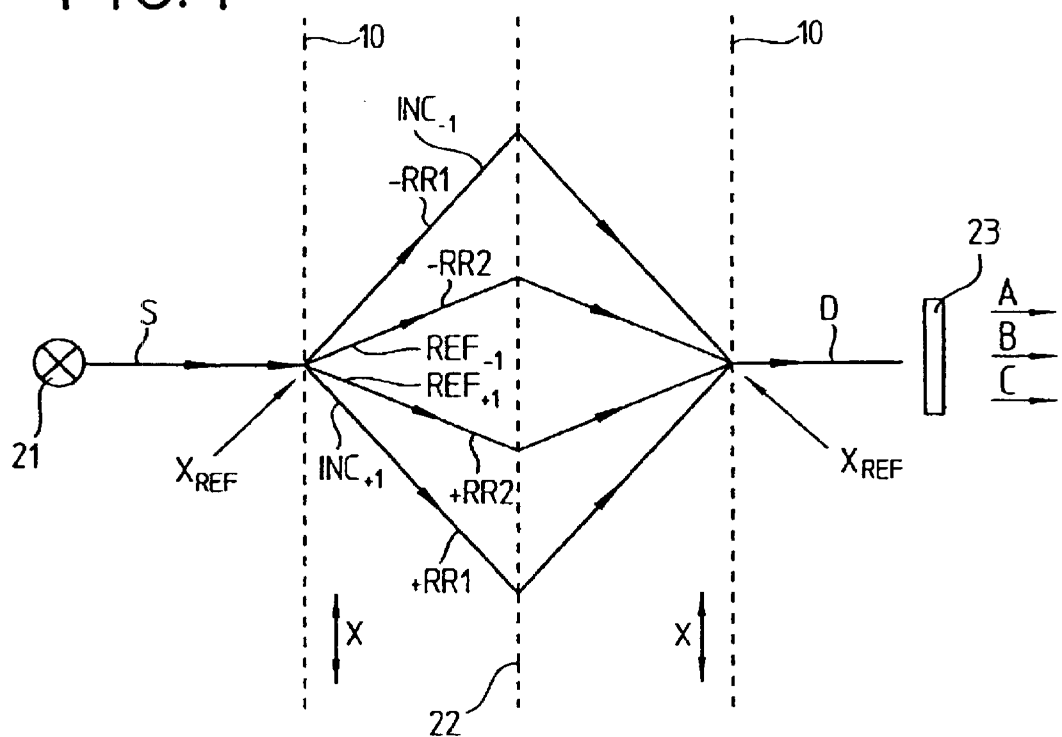
FIG. 1 is a schematic representation of the unfolded scanning beam path of an exemplary embodiment of a position measuring system in accordance with the present invention in accordance with the present invention.

The unfolded scanning beam path of an exemplary embodiment of the position measuring system in accordance with the present invention is represented in schematic form in FIG. 1. It should already be pointed out here that alternative scanning configurations, or scanning beam paths exist besides the explained example, which can be realized within the scope of the present invention.

A so-called interferential multi-grating sensor will be explained in what follows by FIG. 1, on whose basis the present invention can be realized. In a known manner, the position measuring system includes, as components which are movable in relation to each other in the measuring direction x, a scale 10, as well as a scanning unit containing a number of scanning elements in a suitable, not represented housing for generating scanning signals. Here the scanning unit substantially includes a light source 21, at least one scanning plate 22 with one or several scanning graduations, as well as an opto-electronic detector array 23, only indicated schematically, which comprises one or several detector elements.

The unfolded scanning beam path of a variation of the position measuring system in accordance with the present invention operated in incident light is schematically represented in FIG. 1. This means that the beams S emitted by the light source 21 first impinge on the reflectively designed scale 10 and thereafter are propagated as spatially separated partial beams $INC_{+1}$, $INC_{-1}$, $REF_{+1}$, $REF_{-1}$ in the direction of the scanning plate 22, or the scanning graduations arranged on it. In the case of the preferred incident light system this takes place by diffraction in the direction of the +/−1st orders of diffraction at the scale 10. The partial beams $INC+_1$, $INC_{-1}$, $REF_{+1}$, $REF_{-1}$ are again diffracted in the +/−1st orders at the scanning plate 22, so that they are united again at the position $x_{REF}$ at the scale 10. There they are again diffracted in +/−1st orders and are propagated as combined beams D in the direction of the detector array 23. The information regarding a resulting displacement of the scale 10 and the scanning unit is contained in the form of the partial beams which interfere with each other as a function of the displacement in the beam D, which is detected by the detector array 23. Among the information in the form of an intensity-modulated scanning signal which can be detected by the detector array 23 is information regarding the relative displacement, as well as in regard to an absolute position $x_{REF}$, along the measuring path. Therefore, in this exemplary embodiment the detection of the incremental signal, as well as the at least one reference pulse signal, takes place via the common detector array 23.

In principle it would also be possible within the scope of the present invention to employ separate detector arrays for detecting the incremental and reference pulse signals.

Customarily several phase-shifted scanning signals are generated in incremental position measuring systems, which are the further processed in a known manner. Further steps on the part of the scanning unit are required in regard to the beam D for generating the phase-shifted scanning signals, which are familiar to one skilled in the relevant art and therefore will not be further described here. In this connection, reference is made by way of amplification to WO 02/23131 of Applicant.

For reasons of improved representability, transmitting graduation structures on the part of the scale 10, as well as of the scanning plate 22, are represented without exception in FIG. 1. As already explained, in a preferred embodiment the scale 10 is embodied as a reflecting graduation structure in the form of a reflecting phase grating, i.e. in contrast to the representation in FIG. 1, only a single, twice-charged scale 10 is provided, which is reflectingly operated. Since in such a system partial beams are required, which are diffracted at the scanning plate 22 in the direction of the scale 10, in a possible variation the scanning plate 22 can also be designed to be reflecting. In a variation alternative to this, two scanning plates 22 are employed, which are used in incident light and are identically embodied, between which a suitable deflection prism is arranged, by which the deflection of the split beams in the direction toward the second scanning plate, or the scale 10 takes place. In the case of such a variation this is strictly speaking a four-grating sensor, wherein the first and fourth grating through which the light passes corresponds to the scale 10 used in reflection, and the second and third grating correspond to the respectively identically embodied scanning plates 22 between which the deflection prism is arranged. Regarding the last mentioned variation and further details of such a scanning beam path, reference is made here specifically to WO 02/23131 of Applicant.

Figure 4:
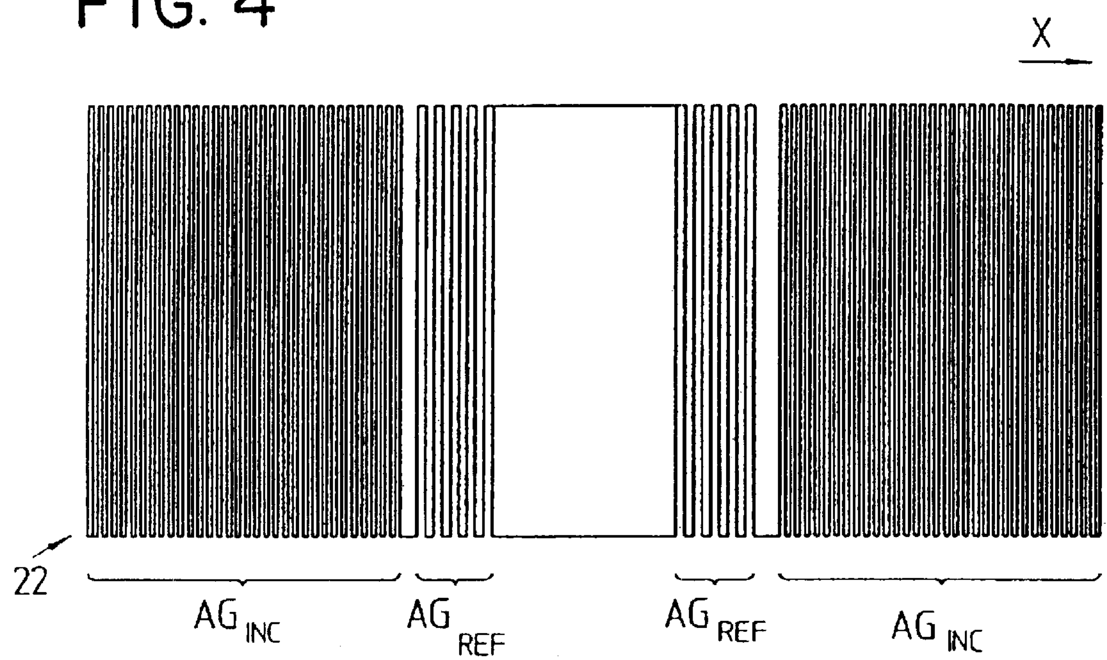
FIG. 4 is a view from above of an embodiment of a scanning plate of the position measuring system in FIG. 1 in accordance with the present invention.

The generation of the scanning signals, or of the incremental and reference pulse signals by the device in accordance with the present invention will be explained in detail in what follows by FIGS. 1 to 4. Each one of FIGS. 2 and 4 represents a greatly schematized view of the structures on the scale 10, or of the scanning plate 22 in FIG. 1.

Figure 2:
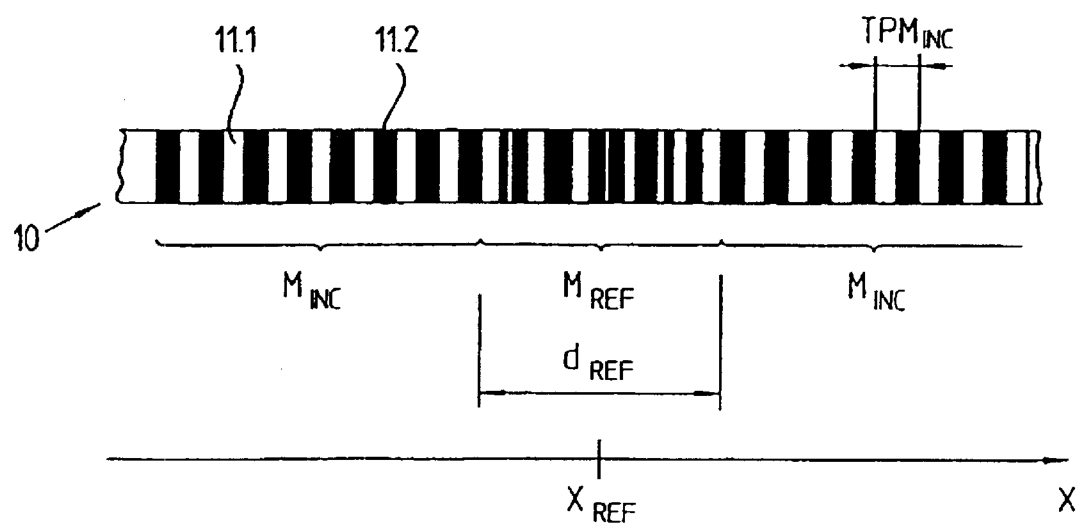
FIG. 2 is a view from above of an embodiment of a scale of the position measuring system in FIG. 1 in accordance with the present invention.

A partial view from above on the scale 10 is represented in FIG. 2, in which the incremental graduation track is visible, which includes an incremental areas $M_{INC}$ with a defined incremental graduation period $TPM_{INC}$ and from whose scanning one or several incremental signals A, B, C result. A reference marking field $M_{REF}$ is arranged at the definite predetermined reference position $x_{REF}$ between two incremental areas $M_{INC}$ and in this location is used for generating a reference pulse signal Z in order to provide in this way an unequivocal absolute reference during position determination.

Partial areas 11.1, 11.2 with different optical properties are arranged in the incremental areas $M_{INC}$ periodically with the incremental graduation period $TPM_{INC}$. In the case where the scale is embodied as a reflection phase grating, these are for example alternatingly arranged partial areas 11.1, 11.2, which result in a different phase shift of the diffracted beams. In a possible embodiment, the incremental graduation period $TPM_{INC}$ is, for example, $TPM_{INC}$=2 $\mu$m. In a known manner, at least one high-resolution periodic incremental signal with the incremental signal period $SP_{INC}$ results from the scanning of the incremental areas $M_{INC}$, such as has already been disclosed in the above mentioned WO 02/23131. Thus, in case of a selected incremental graduation period $TPM_{INC}$=2 $\mu$m, the result is an incremental signal period $SP_{INC}$=0.5 $\mu$m. Preferably two or more incremental signals are generated in this way, which have a defined phase offset with respect to each other, wherein in the case of two, or four, incremental signals, a phase offset of 90° results, while in the case of three incremental signals a phase offset of respectively 120° is provided.

In the present exemplary embodiment a reference marking field $M_{REF}$ is arranged, directly integrated into the incremental graduation track, at the reference position $x_{REF}$, which also includes an arrangement, alternating in the measuring direction x, of partial areas with different optical properties. In accordance with the present invention, this graduation structure differs in a defined way from the periodic graduation structure in the incremental area $M_{INC}$ in order to generate in this way a detectable reference pulse signal at this location. In a concrete embodiment, the extension $d_{REF}$ of the reference marking field $M_{REF}$ in the measuring direction x is typically $d_{REF}$=600 $\mu$m.

The size, or design of the graduation structure in the reference marking field $M_{REF}$ is now subject to certain considerations within the scope of the present invention. It is selected, or dimensioned in such a way that advantageously a graduation period is present in the area of the reference marking field $M_{REF}$, which will be called the mean reference marking graduation period $TPM_{REF,m}$ in what follows. In accordance with the present invention, the selection of the mean reference marking graduation period $TPM_{REF,m}$ takes place in such a way that it differs from the incremental graduation period $TPM_{INC}$, a concrete numerical example will follow in the course of the further description. Furthermore, in the present exemplary embodiment, the reference marking field has, besides the mean reference marking graduation period $TPM_{REF,m}$, a second periodicity, namely the periodicity of the incremental graduation period $TPM_{INC}$.

However, the provision of the two periodicities in this area is not important for the present invention, instead it was selected in the present exemplary embodiment because no separate detector elements for detecting the incremental signal and the reference pulse signal are provided. It is therefore desirable that an incremental signal with as little as possible disturbance is present in the area of the reference marking field, i.e. that in any case incremental position information is also available in this area. In principle it would be sufficient without this requirement to only provide the reference marking graduation period $TPM_{REF,m}$ differing from the incremental graduation period $TPM_{INC}$ in the area of the reference marking field.

In the present exemplary embodiment at least one periodic incremental signal results at the output of the scanning unit, which shows a disturbance in the area of the reference position $x_{REF}$, or in the area of the reference marking field $M_{REF}$, and which can be extracted from the periodic incremental signal(s) in the form of a high-resolution reference pulse signal.

Therefore, in this example different spatial deflection effects result for beams S impinging on the reference marking field $M_{REF}$ in the spatial area of the reference marking field $M_{REF}$ of the scale 10 because of the at least two different graduation periods $TPM_{INC}$ and $TPM_{REF,m}$ which are present there. In a possible embodiment, the mean reference marking graduation period $TPM_{REF,m}$, for example, is selected to be slightly different from double the incremental graduation period $TPM_{INC}$. Moreover, in principle there are the most diverse other relationships between the different graduation periods $TPM_{INC}$ and $TPM_{REF,m}$, provided that it is basically intended to provide more than only the reference marking graduation period $TPM_{REF,m}$ in the corresponding reference marking field $M_{REF}$.

In many cases, for separating the orders of diffraction of the incremental signal scanning beam path and of the reference pulse signal scanning beam path, it is possible to select a base periodicity, or mean reference marking graduation period $TPM_{REF,m}$ in the reference marking field $M_{REF}$, which clearly differs from the incremental graduation period $TPM_{INC}$. The periodicities are always determined in such a way that a beat signal portion of a beat signal period $\Lambda$ results. The beat signal period $\Lambda$ results here from the following equation:

$$1/\Lambda=|n/SP_{INC}-m/SP_{REF,m}| \quad \text{(Equ. 1)}$$

wherein $SP_{INC}$: incremental signal period $SP_{REF,m}$: mean reference pulse signal period n, m=1, 2 . . . : n, m do not have a common divisor The different periodicities $SP_{INC}$, $SP_{REF,m}$ are advantageously selected in such a way that the following applies to the resulting beat signal period $\Lambda$:

$$\Lambda=(5-100)*SP_{INC} \quad \text{(Equ. 2)}$$

In a concrete example, meeting of this condition is assured with $TPM_{INC}$=2 $\mu$m (corresponds to $SP_{INC}$=0.5 $\mu$m), $TPM_{REF,m}$=4.55 $\mu$m (corresponds to $SP_{REF,m}$=1.1375 $\mu$m), n=1, m=2, from which a beat signal period $\Lambda$=4.1 $\mu$m results.

The importance of the resulting beat signal for the present invention will be explained in detail in the further course of the specification.

A basic explanation will be provided in what follows by FIGS. 3*a* to 3*c* how, for example, the graduation structure in the area of the reference marking field $M_{REF}$ can be dimensioned. Grating structures, still to be explained, including a sequence of ridges and gaps, are represented in each of FIGS. 3*a* to 3*c* in lateral views inclusive of the associated sine functions, which define the grating phase at the respective position, or the position of the ridge edges of the gratings.

FIG. 3*a* shows a first grating structure with a first graduation period which, for example, corresponds to the provided incremental graduation period $TPM_{INC}$ on a scale.

A second grating structure with a second graduation period, which corresponds to a desired mean reference marking graduation period $TPM_{REF,m}$, is represented in FIG. 3*b*. In the present example the selection of the relationships of the reference marking and incremental graduation periods $TPM_{INC}$, $TPM_{REF,m}$ was made as explained above, i.e. the mean reference marking graduation period $TPM_{REF,m}$ is selected to be slightly different from double the incremental graduation period $TPM_{INC}$.

Finally, FIG. 3*c* shows the additive superimposition of the two grating structures in FIGS. 3*a* and 3*b*. Accordingly, the superimposed structure contains the first, as well as the second graduation period $TPM_{INC}$, $TPM_{REF,m}$, respectively the incremental graduation period $TPM_{INC}$, as well as the reference marking graduation period $TPM_{REF,m}$. Such a resulting grating structure can then be arranged in a reference marking field $M_{REF}$ on the scale, as was explained above in FIG. 2. The grating structure in the adjacent incremental areas $M_{INC}$ of the incremental graduation track is embodied in accordance with FIG. 3*a*.

This explanation of the principles for designing the reference marking field on the scale are of course to be understood as being by way of example. Therefore multiple alternative design options for the respective design of the reference marking field exist within the scope of the present invention.

It is possible to see in the basic representation in FIG. 1 what effects such a design of the graduation structure in the present exemplary embodiment in the area of the reference marking field $M_{REF}$ has on the scanning beam path. Because of the existing at least two graduation periods $TPM_{INC}$ and $TPM_{REF,m}$ in this area, splitting of the beam S coming from the direction of the light source 21 takes place into the partial beams $INC_{+1}$, $INC_{-1}$, $REF_{+1}$, $REF_{-1}$, which are further propagated in at least two different spatial directions +RR1, −RR1, +RR2, −RR2. In the present example, splitting of the incoming beam S into a total of four partial beams $INC_{+1}$, $INC_{-1}$, $REF_{+1}$, $REF_{-1}$ results. In this case the partial beams $INC_{+1}$, $INC_{-1}$, represent the +/−1 st order of diffraction of the incoming beam S, which were deflected into the spatial directions +RR1 and −RR1 because of the selected incremental graduation period $TPM_{INC}$, but the partial beams $REF_{+1}$, $REF_{-1}$ represent the +/−1 st order of diffraction of the incoming beam S, which were deflected into the spatial directions +RR2 and −RR2 because of the selected incremental graduation period $TPM_{REF,m}$. While the partial beams $INC_{+1}$, $INC_{-1}$, contribute to the generation of the at least one incremental signal on the scanning side, the partial beams $REF_{+1}$, $REF_{-1}$ which only appear in the area of the reference marking field $M_{RFF}$ cause a definite disturbance with the incremental signal at this location, which can be extracted from the at least one incremental signal in the form of a reference pulse signal. Incidentally, in the concrete example the generation of three incremental signals occurs, which are phase-shifted by 120° from each other, called incremental signals A, B, C in what follows.

Besides the explained steps on the part of the scale in the area of the reference marking field $M_{REF}$, certain steps are also required within the scope of the present invention on the part of the scanning unit and the scanning elements, i.e. in particular on the part of the scanning plate 22. As can also be seen in this connection in FIG. 1, the scanning plate 22 has at least one graduation structure which is embodied such that the partial beams $INC_{+1}$, $INC_{-1}$, $REF_{+1}$, $REF_{-1}$ impinging on it from the different spatial directions +RR1, −RR1, +RR2, −RR2 are again reflected back to the scale 10 in the direction toward the reference marking filed $M_{REF}$. A beam D is then propagated from the scale 10 in the direction of the detector array 23. The displacement-dependent information regarding the incremental signals A, B, C, as well as the reference pulse signal in the form of the interfering partial beams $INC_{+1}$, $INC_{-1}$, $REF_{+1}$, $REF_{-1}$, are contained in the beam D, as explained above.

FIG. 4 represents a view from above on an embodiment variation of a suitable scanning plate 22, which can be employed in a device with a scanning beam path in accordance with FIG. 1. As can be seen from the representation in FIG. 4, in this example the scanning plate 22 has scanning graduations in the form of incremental scanning gratings $AG_{INC}$ and reference scanning gratings $AG_{REF}$, which are arranged spatially separated from each other. The various scanning gratings $AG_{INC}$, $AG_{REF}$ again includes a sequence of partial areas with different optical properties, which are each alternatingly arranged in the measuring direction x. In the case of a scanning plate 22 employed in incident light, this can be, for example, a known incident light phase grating in which partial areas of different phase-shifting effects are alternatingly arranged.

As can be seen in FIG. 1, the partial beams $INC_{+1}$, $INC_{-1}$, being propagated away from the scale 10 in the area of the reference marking field $M_{REF}$ therefore impinge on the two incremental scanning gratings $AG_{INC}$ arranged on the exterior of the scanning plate 22. But the two partial beams $REF_{+1}$, $REF_{-1}$ reach the two reference scanning gratings $AG_{REF}$ arranged in the center. Each of the grating periods $TPAG_{INC}$, $TPAG_{REF}$ of the incremental scanning gratings $AG_{INC}$ and the reference scanning gratings $AG_{REF}$ have been selected, or matched to each other, in such a way that—as can be seen in FIG. 1-*a* deflection of the partial beams from the various scanning grating area back in the direction of the reference marking field $M_{REF}$ on the scale 10 takes place. In the concrete example in FIG. 4 this means that the incremental scanning grating graduation period $TPAG_{INC}$ is to be selected smaller than the reference scanning grating graduation period $TPAG_{REF}$ in order to meet the mentioned requirements.

Following the second diffraction of the partial beams at the scale 10, a recombined beam D results, which is propagated in the direction of the detector array and, in the various partial beams interfering with each other, contains information regarding the relative displacement, as well as in regard to a defined reference position $x_{REF}$. The detection of the resulting scanning signal takes place by the schematically indicated detector array 23.

Figure 5:
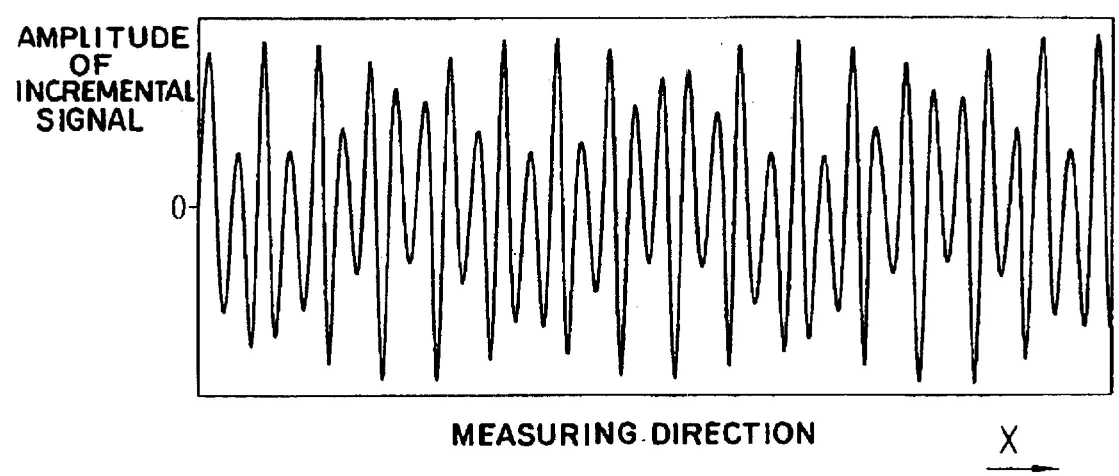
FIG. 5 is the representation of a single resulting scanning signal which can be generated by the position measuring system in FIG. 1.

The scanning signals resulting from such scanning in the area of the reference marking $M_{REF}$ in the present example are represented in FIG. 5, wherein only one of the phase-shifted incremental signals is illustrated in FIG. 5. In the detected scanning signals, the high-frequency signal portion represents the high-resolution incremental signal with the signal period $SP_{INC}$, while in the area of the reference marking field a disturbance is superimposed on the scanning signal at the reference position $x_{REF}$, which can be extracted from the scanning signal for generating a high-resolution reference pulse signal. This will be explained in detail in what follows.

Therefore the effect of the reference marking field on the scale because of the steps in accordance with the present invention only appears in a very limited spatial range in the resulting scanning signal. Initially, this range is determined by the dimensions of the reference marking field. In this connection so-called chirped graduation structures, such as will be described in the following description, are particularly advantageous. They make substantially narrower ranges possible, in which a reference pulse signal can be detected. Ranges of 40 μm can be typically achieved if the above mentioned orders of magnitude for the various graduation periods, etc., are maintained. It is therefore possible in spite of a clearly greater extension of the reference marking field on the scale to generate a reference pulse signal of little width, i.e. with a very large spatial resolution. The high resolution which can be achieved in the generation of the reference pulse signal permits synchronization in particular with the also high-resolution incremental signals.

In order to additionally assure sufficient insensitivity toward possible tilting of the scanning unit with respect to the scale in the course of the employment of the position measuring system of the present invention, it has furthermore been shown to be advantageous if the size of the reference marking field is selected to be such that it approximately corresponds to the size of the cross section of the beam emitted by the light source.

In what follows, an explanation will be provided by FIGS. 6 and 7*a* to 7*e* how the generation in accordance with the present invention of a high-resolution reference pulse signal from the resulting scanning signals takes place.

Figure 6:
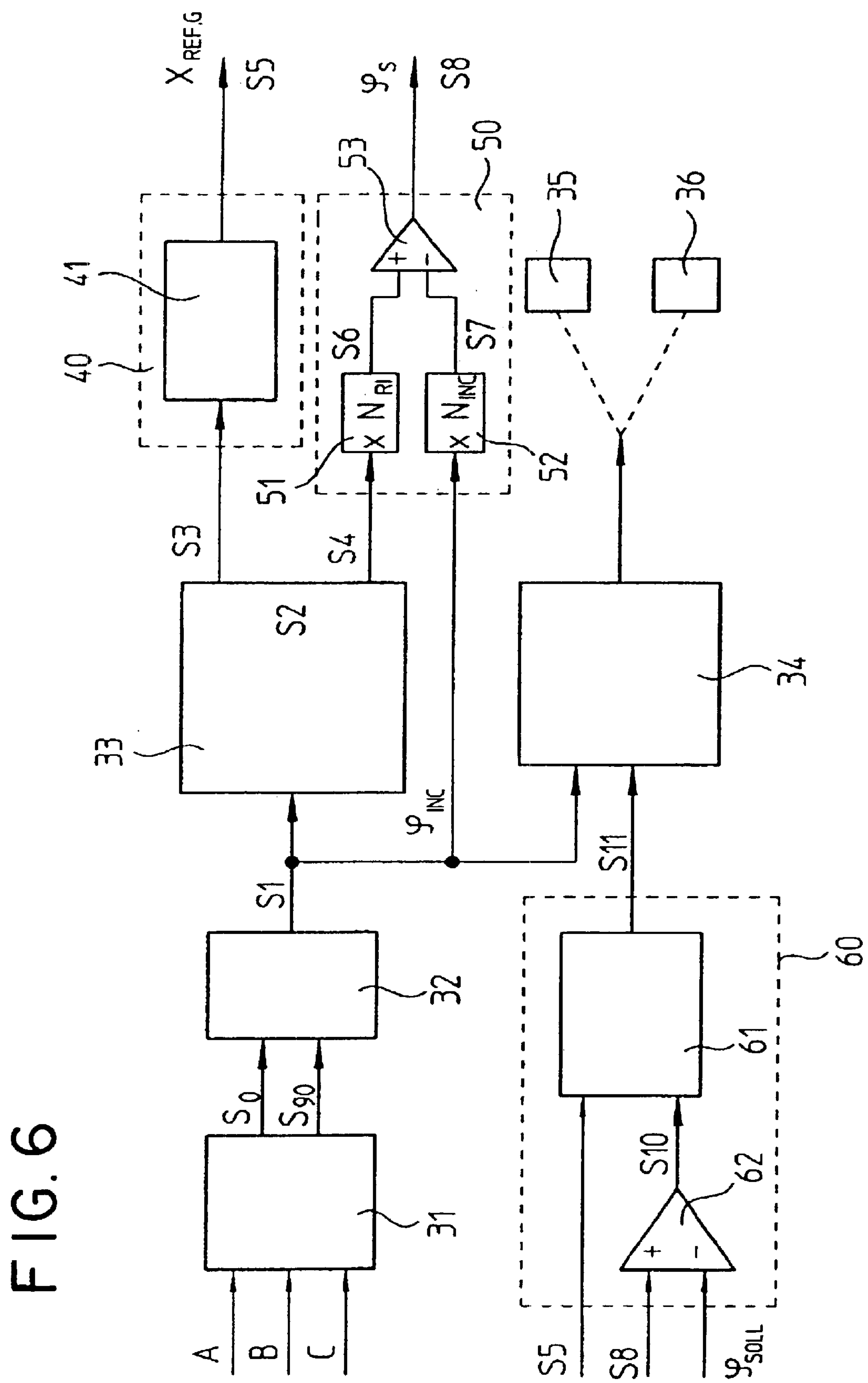
FIG. 6 is an example of a block circuit diagram to explain the generation in accordance with the present invention of a high-resolution reference pulse signal in accordance with the present invention.

To this end, a greatly schematized block circuit diagram is represented in FIG. 6 for explaining the signal processing taking place following the generation of the scanning signals A, B, C in the scanning unit. Strictly speaking, FIG. 6 does not represent a signal processing arrangement, instead it is used for explaining the algorithm by which the high-resolution reference pulse information is generated in accordance with the present invention. It is therefore not necessary that the various function blocks and function units be embodied as hardware. Basically it is most advantageous if signal processing, such as will be explained in what follows, is performed in a digital computer device in the form of ASICs, FPGAs and/or signal processors.

The scanning signals A, B, C which, in the present case are phase-shifted by 120°, are initially conducted to a transformation unit 34, in which these signals A, B, C are converted in a known manner into two incremental signals $S_0$, $S_{90}$, which are phase-shifted by 90° and have an imposed disturbance in the area of the reference position $x_{REF}$, as explained above.

Before addressing the further function blocks in detail within the framework of the performed signal processing in what follows, first the basic principle of the generation in accordance with the present invention of high-resolution reference pulse information from the generated scanning signals will be explained. A multi-step process for the extraction or generation of this information is essentially provided in this connection. Within the scope of the signal processing taking place, first evaluation device 40 is provided, which is suitable for the determination of a rough reference position $x_{REF,G}$ from the maximum of the resultant disturbance in the scanning signals at a defined relative position of the scale 10 and the scanning unit 20. Moreover, a second evaluation device 50 is required, which is suitable for the determination of a beat signal phase from the difference between a whole-number multiple of the reference pulse signal phase and a whole-number multiple of the incremental signal phase. Furthermore, a third evaluation device 60 is provided, which is located downstream of the first and second evaluation devices 40, 50 and is suitable to unequivocally mark a beat signal period from the rough reference position $x_{REF,G}$ and to emit a signal or information in regard to a fine reference position $x_{REF,F}$ from the beat signal phase if a defined phase position exists.

The further processing of the phase-shifted incremental signals $S_0$, $S_{90}$ via the various function blocks within the scope of the signal processing taking place will now be explained in detail in what follows.

Figure 7A:
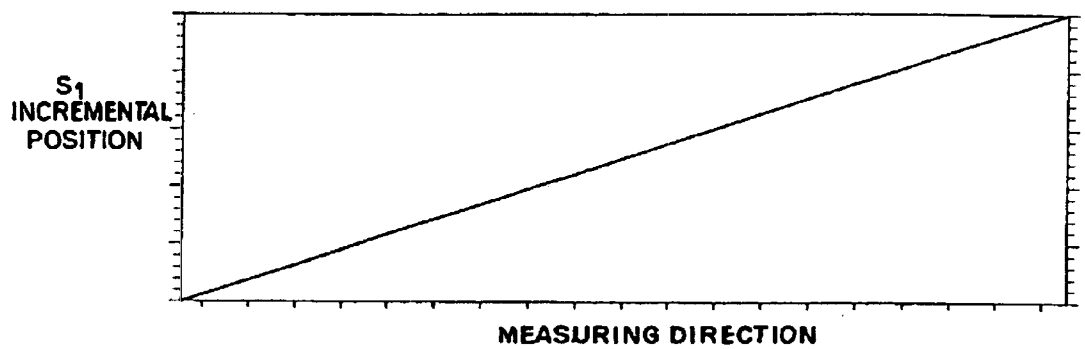
FIGS. 7*a* to 7*e* each show a signal diagram for explaining the block circuit diagram in FIG. 6.

First, the incremental signals $S_0$, $S_{90}$ are conducted to an interpolator and counting unit 32, which processes these signal in a known manner. This means that the incremental signals are divided and the interpolated signals are provided to a counter. Accordingly, a high-resolution signal S1 regarding the respective incremental position results at the output of the unit 32. The chronological course of the respective signal in the case of an even movement of the scale in relation to the scanning unit is represented in FIG. 7*a*. This disturbance cannot be detected in the representation in FIG. 7*a* because of the slight disturbance with the scanning signals by the reference marking, i.e. in accordance with the representation in FIG. 7*a* the result is a linear increase of the incremental position (ordinate: y-axis) over time (abscissa: x-axis).

Figure 7B:
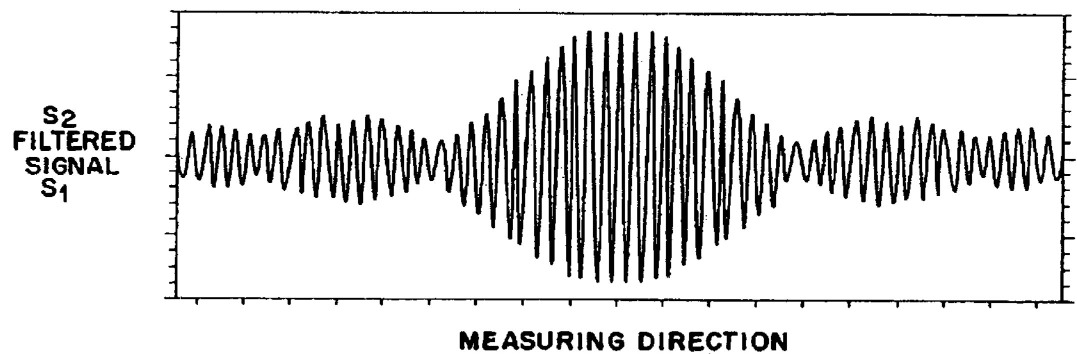

Thereafter the signal S1 is conducted in a first processing branch to a filter 33, which is embodied as a band pass filter, which filters the frequency portions of the incremental signals out of the signal S1. Therefore the filter 33 constitutes a blockage in the frequency range of the incremental signal frequency $f_{INC}$. A corresponding filtered signal S2, which is substantially caused by the effect of the mean reference pulse signal period $SP_{REF,m}$, is represented in FIG. 7*b*.

Figure 7C:
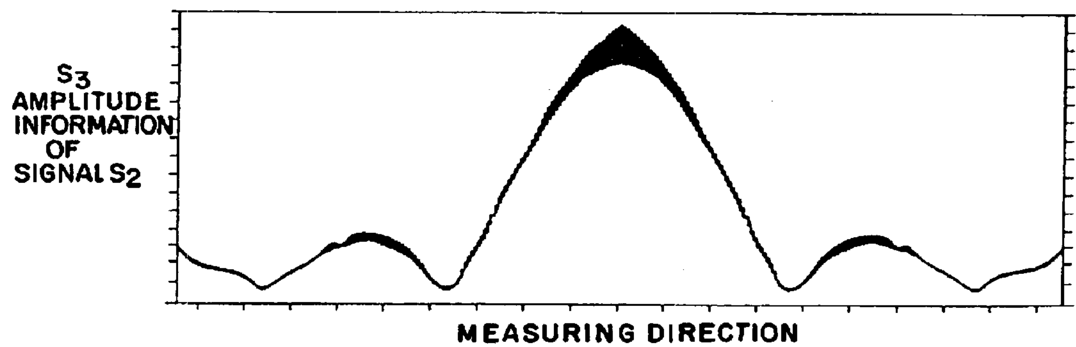
Figure 7D:
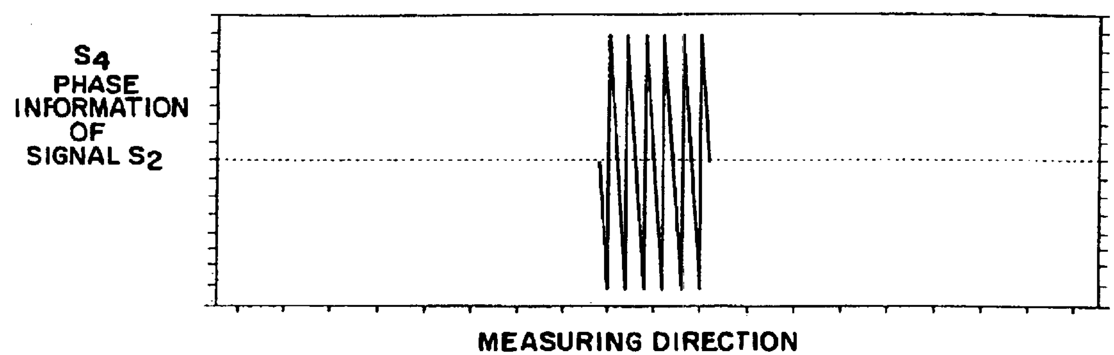
Figure 7E:
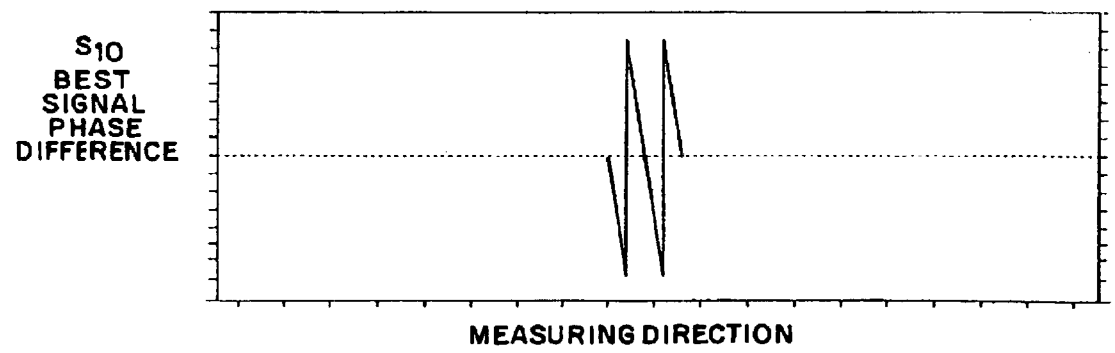

Information regarding the amplitude or phase of the filtered signal S2 is subsequently further used in the form of the two signals S3 or S4. The signals S3 or S4 are represented in FIGS. 7*c* and 7*d*.

The signal S3 regarding the reference pulse signal amplitude is then conducted to a maximum detector 41, by which the amplitude maximum of the signal S3 is determined. The amplitude maximum determined in this way marks the rough reference position $x_{REF,G}$, i.e. information, or a signal S5 regarding a rough reference position $x_{REF,G}$ is present at the output of the maximum detectors 41 and will subsequently be processed further. Incidentally, in the above used terminology the maximum detector 41 represents the first evaluation device, which is identified in the drawings as a function block with the reference symbol 40.

The signal S1 resulting at the output of the interpolator and counting unit 32 is furthermore also conducted as a signal regarding the incremental signal phase to a function block with the reference symbol 50, which substantially represents the above mentioned second evaluation device. The signal S4 regarding the reference pulse signal phase at the output of the filter 32 is furthermore conducted to the second evaluation device 50. On the part of the second evaluation device 50, the multiplication of the respective input signals with the whole-number factors $N_{RI}$ or $N_{INC}$ is performed at the input by the multiplication units 51 and 52. Accordingly, respective signals S6, S7 regarding whole-number multiples of the reference pulse signal phase or the incremental signal phase are present at the output of the multiplication units 51, 52. On the part of the second evaluation device 50, the signals S6, S7 are finally conducted to the inputs of a difference-forming unit 53. Following the forming of a difference, a signal S8 regarding a beat signal phase $\phi_s$ is present at the output of the difference-forming unit 53, and therefore at the output of the second evaluation device 50.

Subsequently the signals S5, S8 regarding the rough reference position $x_{REF,G}$ and regarding the beat signal phase $\phi_s$ resulting at the outputs of the first and second evaluation devices 40, 50 are conducted to a function block with the reference symbol 60, which substantially represents the third evaluation device also already mentioned above.

The third evaluation device here includes a difference—forming unit 62, in which a subtraction of a fixed, selectable nominal phase value $\phi_{Nominal}$ from the beat signal phase $\phi_s$, or the signal S8 takes place. A signal S10 regarding a beat signal phase difference results at the output of the difference-forming unit 62. The signal S10 regarding the beat signal phase difference has the typical saw-tooth-like signal course of phase signals—similar to FIG. 7*e*—and has zero points with the distance of the beat period.

The same as the signal S5 regarding the rough reference position $x_{REF,G}$, the signal S10 is supplied to a selection device 61 which is also a component of the third evaluation device 60. Via the selection device 61 the particular crossover of the beat signal phase difference is determined which lies within the same beat period as the rough reference position $x_{REF,G}$. The crossover selected in this manner is output as the signal S11 and defines the fine reference position $x_{REF,F}$.

Subsequently, in case there is a fine reference position $x_{REF,F}$, a downstream arranged memory 34 is addressed by the signal S11 emitted via the output of the third evaluation device 60. Parallel with the signal S11, this memory 34 is continuously supplied with the value of the signal S1, i.e. the high-resolution position information available at the output of the interpolator and counting unit 32. In case there is a fine reference position $x_{REF,F}$, this position information, i.e. S1, is written, controlled by the signal S11, into the memory 34. This position information will be called the reference pulse offset in what follows.

Thus, the determination of a reference pulse information is performed with the same resolution as the incremental measurement. As a result, a signal S12 which contains the information regarding the fine reference position $x_{REF,F}$ of the desired high resolution is present at the output of the memory 34.

Regarding the concrete use of this information, or of this signal S12, there are various options which, in connection with the processing of reference pulse information, are basically known and are therefore only schematically indicated in the representation of FIG. 6. One the one hand, it is possible via the indicated output 35 to directly output the determined reference pulse offset for further processing. Alternatively it would be possible to provide a subtractor 36, also only schematically indicated, for subtracting the determined reference pulse offset from the incremental position.

Of course alternative embodiments can also be realized within the scope of the present invention besides the embodiment variation so far explained. In this case various variations can be employed in particular in regard to the scanning beam path used for generating the scanning signals.

Thus, the reference marking field on the scale could also be differently designed than it was explained in the above example. It is in particular possible to provide that not only a single further reference marking graduation period $TPM_{REF,m}$ is contained in the reference marking field besides the incremental graduation period $TPM_{INC}$, but instead a spectrum of further reference marking graduation periods $TPM_{REF}$, which are distributed as a function of location around the mean reference marking graduation period $TPM_{REF,m}$. In such a case the scanning plate, or the corresponding scanning graduations, can be correspondingly embodied. This then also contains a spectrum of reference scanning grating graduation periods $TPA_{REF}$, which are distributed around a mean reference scanning grating graduation period $TPA_{REF,m}$ and are appropriately matched to the reference marking graduation period $TPM_{MRF,m}$. Such an embodiment of the reference marking field can take place, for example, in that the respective graduation structures in the reference marking field, as well as in the reference scanning grating, are designed as so-called chirped graduation structures, within which the respective graduation periods are evenly and continuously changed along the measuring direction x. The ratio V of the existing frequency width $\Delta f$ of the spectrum of grating frequencies to the mean reference marking frequency $f_{REF,m}=1/TPM_{REF,m}$ here determines the width of the disturbance with the resultant scanning signal. This ratio $V=\Delta f/f_{REF,m}$ advantageously lies in the range between 0.001 and 0.5.

It would moreover be possible to design the scanning plate as a Fresnel lens, which advantageously reflects the graduation structure of the scale back to the scale. Such a Fresnel lens can be arranged symmetrically (on axis), as well as asymmetrically (off axis) with respect to the optical axis of the scanning beam path.

In the case of a scale design in accordance with FIG. 2 it is furthermore possible to provide only a single scanning graduation on the scanning side, or respectively on the scanning plate, i.e. not to provide spatially separated partial areas which respectively function as incremental scanning gratings and reference scanning gratings, but instead to realize the respectively necessary deflection effects by a single scanning graduation. To this end, at least the required reference scanning grating graduation period $TPAG_{REF}$ and the incremental graduation period $TPAG_{INC}$ are contained in the corresponding scanning graduation, which then cause a deflection of the beams impinging from the various spatial directions in the direction toward the scale. This embodiment variation of the scanning side has been shown to be useful in particular in the case where the scanning plate is arranged very close to the scale, so that therefore no complete spatial separation of the split partial beams from the reference marking field exists, such as was the case in the example explained in FIG. 1, for example.

Besides the exemplary embodiments described, it is understood that alternative variants also exist within the scope of the present invention.

We claim:

1. A position measuring system, comprising:

a scale comprising:

an incremental graduation track of a defined incremental graduation period; and on at least one defined reference position, a reference marking field with a mean reference marking graduation period, wherein said mean reference marking graduation period differs from said incremental graduation period;

a scanning unit movable with respect to said scale, said scanning unit comprising a plurality of scanning elements for generating scanning signals, wherein at least two phase-shifted incremental signals are generated as scanning signals;

a first evaluation device arranged downstream of said scanning unit that determines a rough reference position from a maximum of resultant disturbance with said scanning signals at a defined relative position of said scale and said scanning unit;

a second evaluation device arranged downstream of said scanning unit that determines a beat signal phase from a difference between a whole-number multiple of a reference pulse signal phase and a whole-number multiple of an incremental signal phase; and a third evaluation device arranged downstream of said first and second evaluation devices, which is suitable for unequivocally marking a beat signal period from said rough reference position and, if a defined phase position exists, to issue a fine reference position from said beat signal phase.

2. The position measuring system in accordance with claim 1, wherein said scale and said scanning unit are embodied in such a way, that only two or more phase-shifted incremental signals, which show a disturbance at said reference position, result as scanning signals.

3. The position measuring system in accordance with claim 2, further comprising a filter arranged upstream of said first evaluation device, to which said incremental signals are conducted and by which an elimination of a frequency portion of said incremental signals from said scanning signals takes place.

4. The position measuring system in accordance with claim 3, wherein said filter is a band pass filter, which provides a blockage in said range of said incremental signal frequency.

5. The position measuring system in accordance with claim 3, wherein said first evaluation device comprise a maximum detector that determines an amplitude maximum of a signal at an output of said filter, so that a signal regarding a rough reference position is present at an output of said first evaluation device.

6. The position measuring system in accordance with claim 1, wherein said second evaluation device comprises:

two multiplication units, through which multiplication of input signals regarding said reference pulse signal phase and said incremental signal phase by whole number factors takes place; and a difference-forming unit, to which output signals from said multiplication units are supplied.

7. The position measuring system in accordance with claim 1, wherein said third evaluation device comprises:

a difference-forming unit, by which a subtraction of a fixed, selectable nominal phase value from said beat signal phase takes place; and a selection device through which a particular crossover of the beat signal phase difference is determined which lies within a same beat period as said rough reference position, so that a crossover selected in this way is output as a signal regarding said fine reference position.

8. The position measuring system in accordance with claim 7, further comprising a memory arranged downstream of said third evaluation device that provides an incremental counter offset and which, if there is a fine reference position present, stores said actual incremental position.

9. The position measuring system in accordance with claim 8, wherein an output outputs said incremental counter offset.

10. The position measuring system in accordance with claim 8, further comprising a subtractor that subtracts said incremental counter offset from said incremental position.

11. The position measuring system in accordance with claim 1, wherein said reference marking field on said scale is integrated into said incremental graduation track.

12. The position measuring system in accordance with claim 1, wherein said reference marking field comprises a graduation structure of such a kind that, besides said reference marking graduation period, said incremental graduation period is also contained in it, so that at least two different spatial deflection directions for incoming beams result in an area of said reference marking field.

13. The position measuring system in accordance with claim 1, wherein a spectrum of a plurality of reference marking graduation periods is contained in said reference marking field, which are distributed around said mean reference marking graduation period.

14. The position measuring system in accordance with claim 13, wherein in said reference marking field a ratio of said frequency width to said mean reference marking graduation period is in the range from approximately 0.001 to approximately 0.5.

15. The position measuring system in accordance with claim 1, wherein said mean reference marking graduation period slightly differs from double said incremental graduation period.

16. The position measuring system in accordance with claim 11, wherein said scale is a reflection phase grating.

17. The position measuring system in accordance with claim 1, wherein said scanning unit comprises:

a light source; and a scanning plate comprising a scanning graduation and an opto-electronic detector array.

18. The position measuring system in accordance with claim 12, wherein said scanning graduation has a graduation structure of such a type that partial beams arriving from a direction of said reference marking field in different deflection directions again undergo a deflection in a direction toward said reference marking field on said scale.

19. The position measuring system in accordance with claim 17, wherein said scanning graduation has a graduation structure of such a type that partial beams arriving from a direction of said reference marking field in different deflection directions again undergo a deflection in a direction toward said reference marking field on said scale.

20. The position measuring system in accordance with claim 12, wherein said scanning plate comprises spatially separated partial areas of scanning graduations with incremental scanning gratings and reference scanning gratings.

21. The position measuring system in accordance with claim 17, wherein said scanning plate comprises spatially separated partial areas of scanning graduations with incremental scanning gratings and reference scanning gratings.

22. The position measuring system in accordance with claim 12, wherein said scanning plate has only a single scanning graduation, which causes deflection of beams arriving from different directions toward said reference marking field on said scale.

23. The position measuring system in accordance with claim 17, wherein said scanning plate has only a single scanning graduation, which causes deflection of beams arriving from different directions toward said reference marking field on said scale.

24. The position measuring system in accordance with claim 13, wherein said scanning plate comprises a scanning graduation with a spectrum of scanning graduation periods which is matched to a spectrum of several reference marking graduation periods on said scale.

25. The position measuring system in accordance with claim 17, wherein said scanning plate comprises a scanning graduation with a spectrum of scanning graduation periods which is matched to a spectrum of several reference marking graduation periods on said scale.

26. The position measuring system in accordance with claim 24, wherein said reference marking field and said scanning graduations are each embodied as chirped graduation structures, within which the graduation periods are evenly and continuously changed.

27. The position measuring system in accordance with claim 25, wherein said reference marking field and said scanning graduations are each embodied as chirped graduation structures, within which the graduation periods are evenly and continuously changed.

28. The position measuring system in accordance with claim 17, wherein a size of said reference marking field corresponds to a size of a cross section of a beam emitted by said light source.

29. The position measuring system in accordance with claim 17, wherein said scanning plate is an incident light phase grating.

30. The position measuring system in accordance with claim 17, wherein said scanning unit comprises a deflection prism and;

wherein said scanning unit has a structure such that:

a) beams emitted by said light source first impinge on said scale, where a diffraction back in a direction of said scanning unit takes place;

b) back-diffracted beams pass a first time through said scanning plate in said scanning unit and are propagated in a direction toward said deflection prism;

c) said deflection prism causes a deflection in a direction toward said scanning plate takes place, through which a second passage takes place; and d) said beams impinge a second time on said scale, which provides a diffraction in a direction of said detector array.

* * * * *